(12) United States Patent
Lee et al.

(10) Patent No.: US 12,451,764 B2
(45) Date of Patent: Oct. 21, 2025

(54) MOTOR HAVING COOLING FLOW PATH

(71) Applicants: Hyundai Motor Company, Seoul (KR); Kia Corporation, Seoul (KR)

(72) Inventors: Jung Woo Lee, Seoul (KR); Young Jin Shin, Changwon-Si (KR); Ju Ho Lee, Gwangmyeong-Si (KR); Young Chul Kim, Gwangmyeong-Si (KR); Jong Hoon Lee, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 392 days.

(21) Appl. No.: 18/104,663

(22) Filed: Feb. 1, 2023

(65) Prior Publication Data
US 2024/0088751 A1 Mar. 14, 2024

(30) Foreign Application Priority Data
Sep. 13, 2022 (KR) .................. 10-2022-0114653

(51) Int. Cl.
*H02K 9/14* (2006.01)
*H02K 1/27* (2022.01)
*H02K 5/20* (2006.01)

(52) U.S. Cl.
CPC .............. *H02K 9/14* (2013.01); *H02K 1/27* (2013.01); *H02K 5/203* (2021.01)

(58) Field of Classification Search
CPC .......... H02K 9/19; H02K 9/193; H02K 5/203; H02K 5/20; H02K 1/27; H02K 1/2706; H02K 1/272; H02K 1/2726; H02K 1/2733; H02K 1/276; H02K 1/2766; H02K 1/2773; H02K 1/278; H02K 1/2781; H02K 1/2783
See application file for complete search history.

(56) References Cited

U.S. PATENT DOCUMENTS

| 10,707,726 | B2 | 7/2020 | Manabe et al. | |
| 11,025,137 | B2 | 6/2021 | Aronovich et al. | |
| 2018/0076694 | A1* | 3/2018 | Aronovich | H02K 15/12 |
| 2018/0205294 | A1* | 7/2018 | Manabe | H02K 5/1732 |
| 2018/0375395 | A1 | 12/2018 | Yamagishi | |
| 2020/0186003 | A1* | 6/2020 | Fröhlich | H02K 9/193 |

(Continued)

FOREIGN PATENT DOCUMENTS

| JP | 2014-050219 A | 3/2014 |
| JP | 2021-164185 A | 10/2021 |

(Continued)

Primary Examiner — Oluseye Iwarere
Assistant Examiner — Nicholas Lee Setzer
(74) Attorney, Agent, or Firm — Morgan Lewis & Bockius LLP

(57) ABSTRACT

A motor includes a rotor and a stator, in which the rotor includes: a rotor core including a plurality of core portions disposed on a rotation shaft along an axial direction of the rotor, wherein the rotor core includes a core flow path through which a cooling fluid passes through each core portion; and a cooling plate which is inserted between the two divided core portions so that both surfaces are joined to the two neighboring core portions, and a distribution flow path that distributes the cooling fluid supplied from a cooling flow path of the rotation shaft into the core flow path of the two neighboring core portions is provided between at least one of the two neighboring core portions and the cooling plate.

17 Claims, 6 Drawing Sheets

(56) References Cited

U.S. PATENT DOCUMENTS

| | | | | |
|---|---|---|---|---|
| 2020/0328657 | A1* | 10/2020 | Jung | ........................ H02K 11/21 |
| 2021/0167666 | A1* | 6/2021 | Deguchi | ................... H02K 5/20 |
| 2022/0376587 | A1* | 11/2022 | Choi | ........................ H02K 1/28 |
| 2023/0068403 | A1* | 3/2023 | Matsuzaki | ................ H02K 1/32 |
| 2024/0380266 | A1* | 11/2024 | Glückler | .................. H02K 9/19 |

FOREIGN PATENT DOCUMENTS

| | | |
|---|---|---|
| KR | 2020-0076526 A | 6/2020 |
| KR | 2020-0120258 A | 10/2020 |

\* cited by examiner

MOTOR HAVING COOLING FLOW PATH

CROSS-REFERENCE TO RELATED APPLICATION

The present application claims priority to Korean Patent Application No. 10-2022-0114653 filed on Sep. 13, 2022, the entire contents of which is incorporated herein for all purposes by this reference.

BACKGROUND OF THE PRESENT DISCLOSURE

Field of the Present Disclosure

The present disclosure relates to a motor, and more particularly, a motor including a rotor, a stator, and a cooling flow path, disposed in the rotor, through which a cooling fluid passes to cool both the rotor and the stator.

Description of Related Art

As is known, battery electric vehicles, hybrid vehicles, and fuel cell vehicles, which are eco-friendly vehicles, are all electric vehicles in the broad sense of being driven by a motor. The eco-friendly vehicle is provided with a motor which is a driving source for driving a vehicle, and an inverter that drives and controls the motor by converting a direct current (DC) from a high voltage power source into an alternating current (AC) and applying the AC to the motor.

Accordingly, the eco-friendly vehicle utilizes the motor to generate driving force for driving. In the instant case, the motor that drives the eco-friendly vehicle, that is, a driving motor, requires high efficiency and power density.

It is known that the efficiency of the driving motor is about 90% in eco-friendly vehicles being developed recently, and a significant part of the remaining loss is heat loss. Therefore, it is essential to have a stable thermal management system to satisfy the continuously required miniaturization, high output, and high efficiency of the motor.

When the motor is driven, a large amount of heat is generated from a coil, so that the main parts such as the coil need to be cooled. The cooling of an internal permanent magnet synchronous motor (IPMSM), which is widely used as a driving motor for a vehicle today, plays an important role in the efficiency of the motor and the protection of key parts (permanent magnet, coil, etc.).

When the temperature of the permanent magnet is above a certain level, demagnetization of the permanent magnet occurs and the strength of the magnetic force is weakened, so that the efficiency or the like of the motor is greatly adversely affected.

As a result, to prevent over-temperature burnout in the stator coil of the motor or demagnetization in the permanent magnet of the motor since a motor system reaches an over-temperature state exceeding an allowable temperature, effective thermal management and cooling of the motor system is required. To the present end, an appropriate thermal management and cooling system is required so that the motor may be operated stably within the allowable temperature.

A thermal management system for a motor, in particular, a motor cooling system, may be classified into an air cooling type using air, a water cooling type using cooling water, and an oil cooling type using oil according to a coolant, and may be classified into a scattering type using motor rotation and a pumping type using an electric oil pump (EOP) according to an injection method.

Furthermore, the motor cooling system may be classified into a direct cooling method and an indirect cooling method. In recent years, an oil direct cooling method having high cooling efficiency has been widely used due to the demand for high cooling performance.

Meanwhile, recently, a cooling flow path through which a cooling fluid may pass through parts such as a housing, a rotor core, and a stator core of a motor is configured, and the cooling fluid (oil, etc.) supplied to the motor cools the parts while passing through the cooling flow path.

For example, holes may be formed to penetrate through the rotor core to form the cooling flow path, and the oil supplied to the motor may cool the rotor core while passing through the cooling flow path.

However, to form the cooling flow path, many holes penetrating through the rotor core integrally fixed to a rotation shaft need to be formed, and need to be formed in the rotor core to form a complex cooling flow path extending axially and radially around the rotation shaft.

In the instant case, when many holes are formed to penetrate through the rotor core to form a cooling flow path configured for supplying a sufficient cooling fluid, the strength of the rotor core may be greatly reduced.

Furthermore, to secure the necessary strength of the rotor core, a thickness or the like of a specific portion may be increased. In the instant case, a problem of being disadvantageous in terms of performance, such as torque leakage, may appear.

Furthermore, according to the conventional rotor cooling structure, it is possible to supply oil to an end coil portion, which is a coil portion exposed to left and right end portions of the stator among the stator coils in addition to the rotor, cooling the end coil portion. However, it is not possible to provide the cooling effect of the stator core (axial reference center part).

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a motor configured for supplying a sufficient cooling fluid to a rotor core without the need to form a plurality of holes for forming a complex cooling flow path in the rotor core.

Furthermore, the present disclosure provides a motor configured for securing and maintaining a necessary strength of a rotor core without a problem of strength reduction due to many holes penetrating through inside of the rotor core, and cooling both a rotor and a stator without degradation in electromagnetic performance.

The object of the present disclosure is not limited to the above-mentioned object, and other objects not mentioned may be clearly understood by those of ordinary skill in the art (hereinafter referred to as "those skilled in the art") to which the present disclosure belongs from the description below.

The objects of the present disclosure are limited to the above-described objects, and unmentioned or other objects may be appreciated clearly from the following detailed description by a person having ordinary skill in the art (hereinafter referred to as "those skilled in the art") to which the present disclosure belongs.

To achieve the object of the present disclosure as described above, and to perform the characteristic functions of the present disclosure to be described later, the characteristics of the present disclosure are as follows.

According to an exemplary embodiment of the present disclosure, a motor includes a rotor and a stator, in which the rotor includes: a rotor core including a plurality of core portions disposed on a rotation shaft along an axial direction of the rotor, wherein the rotor core includes a core flow path through which a cooling fluid passes through each core portion; and a cooling plate which is inserted between the two divided core portions so that both surfaces are joined to the two neighboring core portions, and a distribution flow path that distributes the cooling fluid supplied from a cooling flow path of the rotation shaft into the core flow path of the two neighboring core portions are provided between at least one of the two neighboring core portions and the cooling plate.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
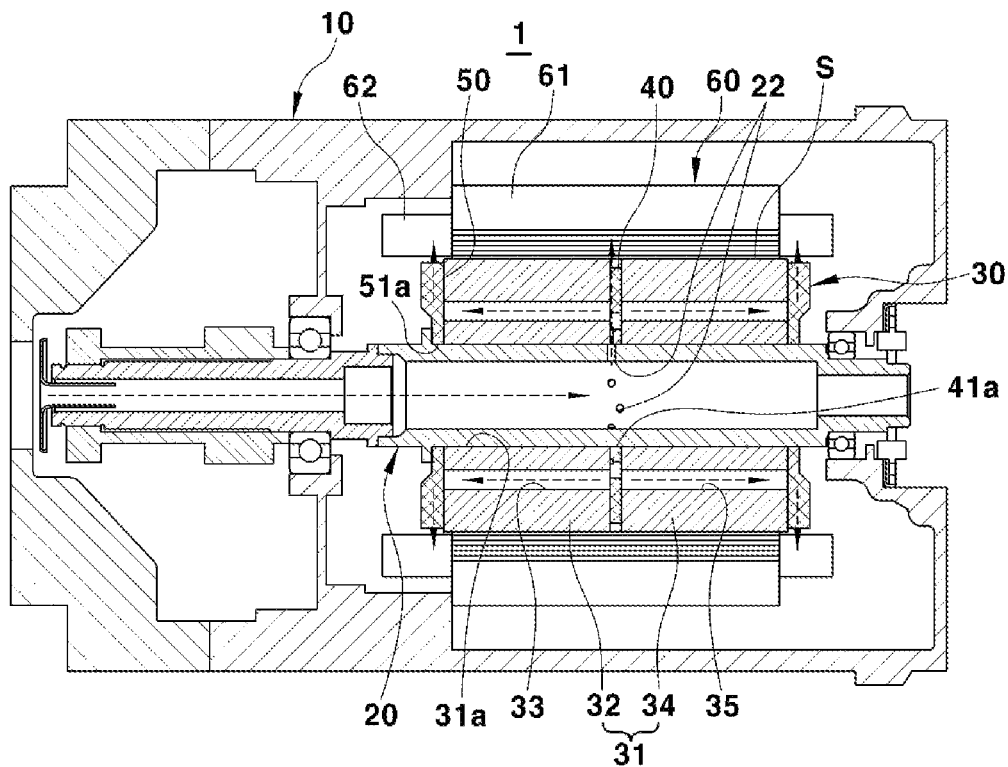
FIG. 1 is a longitudinal cross-sectional view exemplarily illustrating a motor according to an exemplary embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in section by the particularly intended application and use environment.

In the figures, reference numbers refer to a same or equivalent sections of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various embodiments of the present disclosure will be described in detail with reference to the accompanying drawings. Specific structural or functional descriptions presented in embodiments of the present disclosure are only exemplified for describing the exemplary embodiments according to the concept of the present disclosure, and the exemplary embodiments according to the concept of the present disclosure may be implemented in various forms. Furthermore, it is to be understood that the present disclosure is not limited to various exemplary embodiments described in the present specification, but includes all modifications, equivalents, and substitutions without departing from the scope and spirit of the present disclosure.

Meanwhile, in an exemplary embodiment of the present disclosure, terms, such as "first," "second," or the like, may be used to describe various components, but these components are not to be construed as being limited to these terms. The terms are used only to distinguish one component from another component. For example, the 'first' component may be named the 'second' component and the 'second' component may also be similarly named the 'first' component, without departing from the scope of the present disclosure.

It is to be understood that when one component is referred to as being "connected to" or "coupled to" another component, one component may be directly connected to or directly coupled to another component or be connected to or coupled to another component with the other component interposed therebetween. On the other hand, it should be understood that when one element is referred to as being "directly connected to" or "directly coupled to" another element, it may be connected to or coupled to another element without the other element interposed therebetween. Furthermore, other expressions describing a relationship between components, that is, "between," "directly between," "neighboring to," "directly neighboring to" and the like, should be similarly interpreted.

Same reference numerals denote same constituent elements throughout the specification. Terms used In an exemplary embodiment of the present disclosure are for describing exemplary embodiments rather than limiting the present disclosure. Unless otherwise stated, a singular form includes a plural form in the present specification. Components, steps, operations, and/or elements mentioned by terms "comprise" and/or "comprising" used In an exemplary embodiment of the present disclosure do not exclude the existence or addition of one or more other components, steps, operations, and/or elements.

The present disclosure relates to a motor including a cooling flow path through which a cooling fluid may pass, and to a motor configured for supplying a sufficient cooling fluid to a rotor core even if a plurality of complex holes for forming a cooling flow path is formed to penetrate through the rotor core.

Furthermore, the present disclosure relates to a motor configured for securing and maintaining the necessary strength of the rotor core without a problem of strength reduction due to a plurality of holes by minimizing the number of holes penetrating through the inside of the rotor core, and cooling both the rotor and the stator without degradation in electromagnetic performance.

The motor according to an exemplary embodiment of the present disclosure may be a vehicle motor, specifically, a driving motor configured for driving the vehicle. The motor according to an exemplary embodiment of the present disclosure may be a motor in which a coil is wound around a stator core and a permanent magnet is provided in a rotor core, and for example, a synchronous motor in which a permanent magnet is embedded in a rotor core, that is, an internal permanent magnet synchronous motor (IPMSM).

FIG. 1 is a longitudinal cross-sectional view showing a motor according to an exemplary embodiment of the present disclosure. A motor 1 illustrated may be a permanent magnet synchronous motor in which a coil is wound around a stator 60 and a permanent magnet is provided on a rotor 30.

It is to be noted that FIG. 1 schematically illustrates a housing 10 of the motor 1 without illustrating the cross-sectional shape or structure thereof in detail, and schematically illustrates only circuit elements, parts, structures, etc. configured or mounted in the housing 10 in the motor 1 without illustrating them in detail.

In the following description, the term "axial direction" refers to the direction in which a rotation shaft 20 of the motor 1 extends, that is, a central axial (central line in the axial direction along the rotation shaft) direction and a longitudinal direction of the rotation shaft. Furthermore, the "axial direction" is defined as including a direction parallel to the central axial direction of the rotation shaft 20. Furthermore, a "radial direction" refers to a radial direction centered on the rotation shaft 20 of the motor 1.

Although not illustrated in detail in FIG. 1, the motor 1 according to the exemplary embodiment of the present disclosure may have a configuration of an internal permanent magnet synchronous motor in which a permanent magnet is embedded in inside of a rotor core 31, and have a cooling flow path which may supply a cooling fluid supplied through inside of the rotation shaft 20 to the rotor 30 and the stator 60.

Looking at the configuration, as illustrated, the motor 1 according to the exemplary embodiment of the present disclosure includes the rotor 30 that has the permanent magnet provided therein and has the cooling flow path, the stator 60 which has a coil wound therearound and is disposed to have a gap S between the stator 60 and the rotor, a housing 10 which is disposed to surround the stator 60 and the rotor 30, and the rotation shaft 20 which is fixed so that the rotor 30 integrally rotates.

The stator 60 includes a stator core 61 and a coil wound around the stator core 61. In the stator 60, tooth portions are provided at regular intervals on an internal side surface of the stator core 61 over the entire circumference in the circumferential direction, and slots are formed between the adjacent tooth portions, respectively.

Furthermore, the coil is wound around the teeth portion, and since the coil is wound around the teeth portion through the slot, the coil in the stator core 61 is accommodated in the slot while being wound around the teeth portion, and an end coil portion 62, which is an exposed coil portion, is positioned on both end portions of the stator core 61 in the axial direction thereof.

In the housing 10, the rotation shaft 20 and the rotor 30 are disposed inside the stator 60, and includes the rotor core 31 and the permanent magnet (in FIG. 6A, reference numeral "36") provided in the rotor core 31. The rotor core 31 is disposed so that an external circumferential surface has a certain gap S with an internal circumferential surface of the stator core 61. In the instant case, the stator core 61 is disposed to be fixed to an internal side surface of the housing 10.

As is known, the rotor core 31 may be configured by stacking electrical steel sheets which is a magnetic material. Furthermore, insertion holes are formed in the rotor core 31 to be disposed at regular intervals along the circumferential direction, and the permanent magnets 36 are inserted and provided in each insertion hole (see FIG. 6A).

Furthermore, a center hole 31a through which the rotation shaft 20 passes may be formed in a center portion of the rotor core 31, and the rotor core 31 may be mounted to the rotation shaft 20 through the center hole 31a.

The rotor core 31, which is a laminate of the electrical steel sheets, may be fixed to be integrally rotatable with the rotation shaft 20, and the direction in which the electrical steel sheets are stacked in the rotor core 31 may be the axial direction thereof. A method of fixing a rotor core to a rotation shaft may be applied to the known method.

For example, the rotor core 31 may be fixed on an external periphery of the rotation shaft 20 by a press-fit method, or may be fixed by a nut fastening method in which both end surfaces of the rotor core 31 in the axial direction are pressed with a nut and fixed on the rotation shaft 20.

Furthermore, as illustrated in FIG. 1, the end plates 50 may be disposed to be stacked on both end portions of the rotor core 31 in the axial direction, and a center hole 51a through which the rotation shaft 20 of the motor 1 may pass is formed in the center portions of each end plate 50. Accordingly, each end plate 50 may be mounted on the external periphery of the rotation shaft 20 so that the rotation shaft 20 of the motor 1 passes through the center hole 51a.

Furthermore, when the two end plates 50 are mounted on the external periphery of the rotation shaft 20 to be joined to both end portions of the rotor core 31 in the axial direction, a nut member is screwed on the rotation shaft 20 outside the two end plates to press each end plate 50 from, the, the outside thereof, that is, from the opposite side of the rotor core 31, respectively.

Meanwhile, the cooling flow path along the axial direction is formed inside the rotation shaft 20, and the cooling flow path of the rotation shaft 20 may be a hollow internal space of the rotation shaft. That is, the rotation shaft 20 of the motor 1 may be a hollow shaft, and the hollow internal space of the hollow shaft may be the cooling flow path of the rotation shaft through which the cooling fluid may be supplied and flow.

In an exemplary embodiment of the present disclosure, the cooling fluid may be oil which is pumped and circulated by an electric oil pump. In the instant case, the oil has passed through a reducer, and then, may be inflow into the hollow internal space, which is the cooling flow path of the rotation shaft 20, through an inlet portion provided on one end portion of the rotation shaft 20 of the motor 1. The oil introduced into the hollow internal space of the rotation shaft 20 is distributed into the rotor 30 and the stator 60 through a cooling plate 40 to be described later.

Referring to FIG. 1, the cooling plate 40 may be disposed at an approximately intermediate position of the rotor 30 in the axial direction, and may be mounted while the cooling plate 40 is the cooling plate 40 may be located between two electrical steel sheets positioned at an intermediate position in the axial direction among the electrical steel sheets forming the rotor core 31.

A center hole 41*a* through which the rotation shaft 20 may pass is formed in the center portion of the cooling plate 40, and thus, like the rotor core, the cooling plate 40 may be mounted on the external periphery of the rotation shaft 20 so that the rotation shaft 20 of the motor 1 passes through the center hole 41*a*.

In an exemplary embodiment of the present disclosure, the rotor core 31 has a configuration divided into two laminates with the cooling plate 40 interposed therebetween on the rotation shaft 20. That is, the rotor core 31 of the rotor 30 has a configuration in which the rotor core 31 includes two core portions 32 and 34 based on the cooling plate 40. In the instant case, each core portion is configured by stacking the electrical steel sheets as described above.

In an exemplary embodiment of the present disclosure, after two laminates, i.e., two core portions 32 and 34 in which the electrical steel sheets are laminated, are respectively manufactured, the core portions 32 and 34 and the cooling plate 40 are mounted to the rotation shaft 20 so that the cooling plate 40 is disposed between the two core portions 32 and 34.

Referring to FIG. 1, it may be seen that the cooling plate 40 is disposed at the central position of the rotor core 31 in the axial direction thereof. After the cooling fluid supplied to the hollow internal space, which is the cooling flow path of the rotation shaft 20, passes through a through hole 22 later formed in the rotation shaft 20, the cooling fluid is supplied to a core portion (center portion based on the axial direction) of the rotor core 31 through the cooling flow path (distribution path to be described later) on the cooling plate 40 side provided at the central position of the rotor 30 in the axial direction thereof.

Furthermore, the cooling fluid supplied to the core portion of the rotor core 31 through the cooling plate 40 moves to the end plate 50 in the axial direction along the cooling flow path (which is the core flow paths 33 and 35 to be described later) of the rotor core 31, and then, is discharged to the end coil portion 62 of the stator 60 side through a discharge flow path (reference numeral "50" in FIG. 7) radially extending from the end plate 50 and scattered. In the instant case, the scattered cooling fluid cools the end coil portion 62.

In an exemplary embodiment of the present disclosure, the cooling flow path on the cooling plate 40 side distributes the cooling fluid supplied from the cooling flow path of the rotation shaft 20 in both directions at the position of the core portion of the rotor core 31 so that the cooling fluid may flow into the two core portions 32 and 34, and the cooling fluid distributed in both directions at the position of the core portion of the rotor core 31 flows in the axial toward both end portions of the rotor core 31 along the cooling flow paths 33 and 35 of the two core portions 32 and 34.

Accordingly, the cooling fluid cools the rotor portions such as the rotor core 31 and the permanent magnet (reference numeral "36" in FIG. 6A) while passing through the cooling flow paths 33 and 35 of the two core portions 32 and 34.

Furthermore, in an exemplary embodiment of the present disclosure, some of the cooling fluid supplied to the cooling plate 40 from the cooling flow path of the rotation shaft 20 moves radially through a separate cooling flow path on the cooling plate 40 side thereof. The cooling fluid moved radially in the instant way is supplied to the gap S between the rotor 30 and the stator 60. The cooling fluid supplied to the gap S in the instant way cools the stator 60.

Accordingly, in an exemplary embodiment of the present disclosure, the cooling plate is to provide the cooling flow path, and the cooling flow path provided by the cooling plate will be described in detail below with reference to the drawings.

Figure 2:
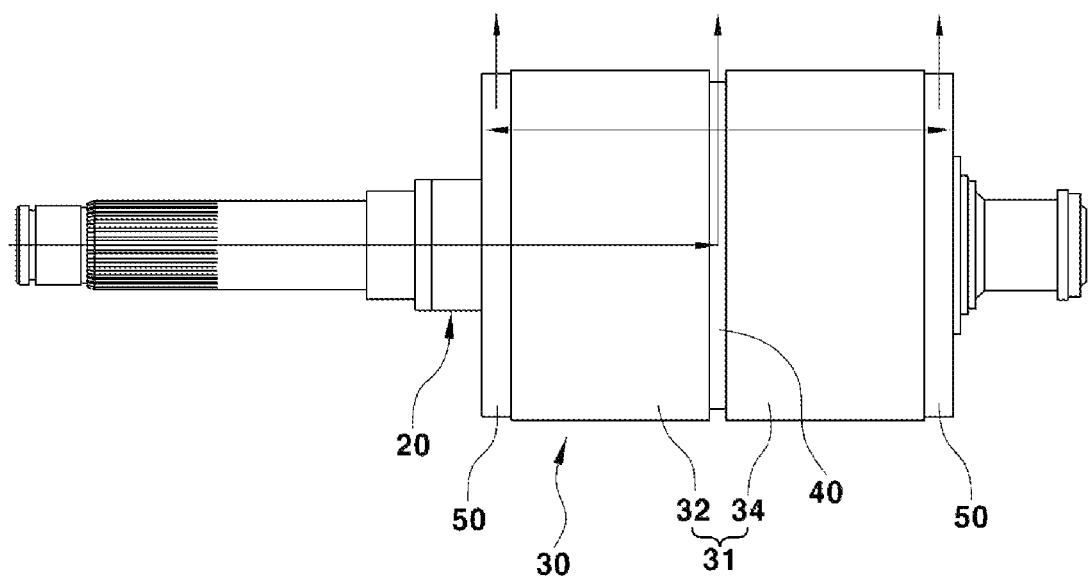
FIG. 2 is a side view exemplarily illustrating an assembly state of a rotation shaft and a rotor in the motor according to the exemplary embodiment of the present disclosure.
Figure 3A:
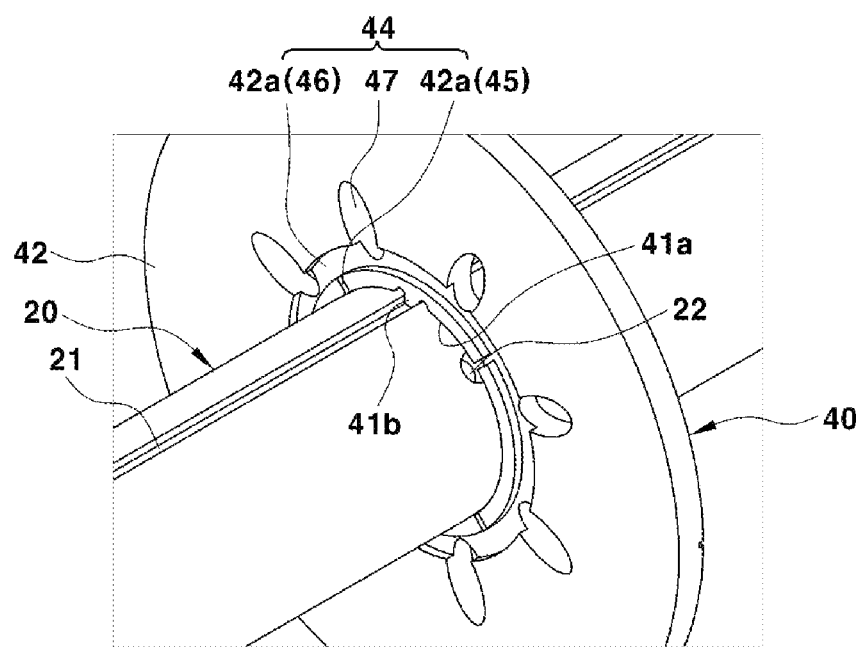
FIG. 3A and FIG. 3B are perspective views of a state in which a rotation shaft and a cooling plate are mounted in the motor according to the exemplary embodiment of the present disclosure.
Figure 3B:
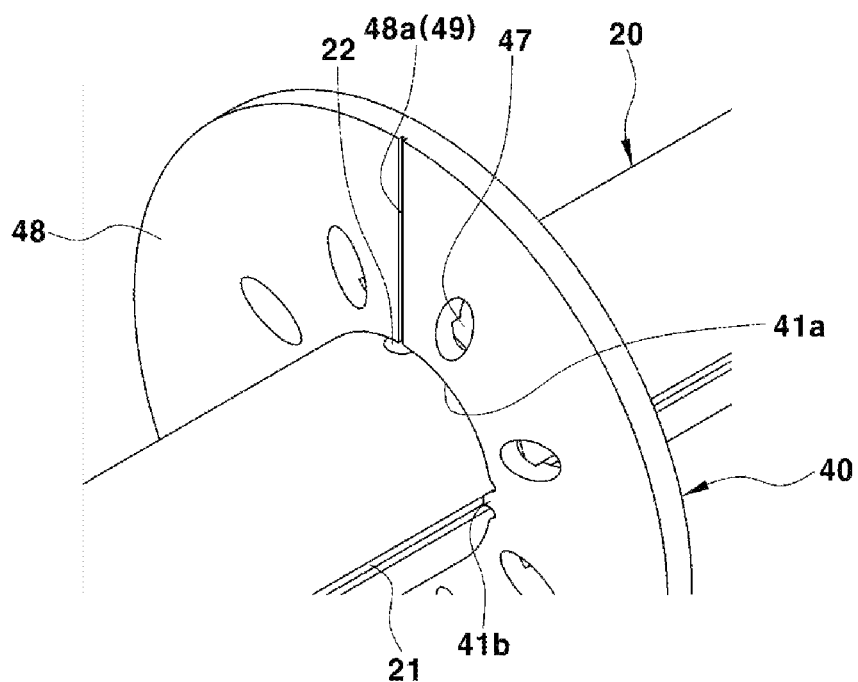

FIG. 2 is a side view exemplarily illustrating the mounted state of the rotation shaft 20 and the rotor 30 in the motor according to the exemplary embodiment of the present disclosure, and FIG. 3A and FIG. 3B are perspective views of the mounted state of the rotation shaft 20 and the cooling plate 40 in the motor according to the exemplary embodiment of the present disclosure. The rotor core mounted to the rotation shaft 20 to be joined to both sides of the cooling plate 40, that is, the two core portions are not illustrated in FIG. 3A and FIG. 3B.

As illustrated, the cooling plate 40 may be a plate of a predetermined thickness manufactured in a circle, and as described above, is stacked on the rotation shaft 20 of the motor 1 to be inserted between two adjacent electrical steel plates forming the rotor core 31.

In the instant case, as described above, the cooling plate 40 is stacked in a state where both sides thereof are joined to the electrical steel plates of the two divided core portions 32 and 34, and may be joined so that the entire of each surface of the cooling plate 40 is completely in close contact with the surface of the electrical steel sheet.

Furthermore, the diameter of the cooling plate 40 may have a same size or smaller than the external diameter of the rotor core 31, that is, the diameter of the electrical steel sheet forming the rotor core 31 as illustrated in FIG. 2. Also, the cooling plate 40 may be made of a non-magnetic material, for example, a non-ferrous metal such as aluminum or a synthetic resin.

In the following description, one surface 42 of both surfaces of the cooling plate 40 will be referred to as a "first surface", and the other surface 48 of both surfaces of the cooling plate 40 will be referred to as a "second surface". FIG. 3A is a perspective view exemplarily illustrating a first surface 42 of both surfaces of the cooling plate 40, and FIG. 3B is a perspective view exemplarily illustrating a second surface 48 of both surfaces of the cooling plate 40.

When the cooling plate 40 is mounted to the rotation shaft 20, the first surface 42 of the cooling plate 40 is in a state of being joined to an end surface (that is, a surface of a last steel plate) of one of the two core portions (laminate) 32 and 34 of the rotor core 31 in the axial direction thereof. Furthermore, the second surface 48 of the cooling plate 40 is in a state of being joined to the end surface (i.e., the surface of the last steel plate) of the other of the two core portions (laminate) in the axial direction thereof.

Reference numeral "41*b*" in FIG. 3A and FIG. 3B denotes a protrusion formed to protrude from an inner side end of the center hole 41*a* in the cooling plate 40, and reference numeral "21" denotes a recessed groove formed long along the axial direction on the external circumferential surface of the rotation shaft 20.

When the cooling plate 40 is mounted on the external periphery of the rotation shaft 20, the protrusion 41*b* of the internal side end of the center hole 41*a* through which the rotation shaft passes is mounted to be inserted into the recessed groove 21 of the rotation shaft 20, so that the cooling plate 40 may be fixed to the rotation shaft 20 by the coupling structure between the protrusion 41b and the recessed groove 21 and the cooling plate 40 may rotate integrally with the rotation shaft 20.

In the present configuration, a plurality of recessed grooves 21 may be formed to be disposed side by side on the external circumferential surface of the rotation shaft 20 at a predetermined interval along the circumferential direction, and similarly, the plurality of protrusions 41b of the cooling plate 40 may also be formed to be disposed one by one at each corresponding position of the recessed groove at a predetermined interval along the circumferential direction from the internal side end of the center hole 41a.

Furthermore, to fix the rotor core 31 to the rotation shaft 20, similar to the cooling plate 40, in the center portion of the rotor core 31, a protrusion is formed at the internal side end of the center hole 31a through which the rotation shaft 20 passes, and the rotor core 31 is mounted to the rotation shaft 20 so that the protrusion is inserted into the recessed groove 21.

Accordingly, the rotor core 31 may always rotate integrally with the rotation shaft 20 by the coupling structure between the protrusion and the recessed groove 21. Furthermore, the plurality of protrusions of the rotor core 31 may also be formed to be disposed one by one at positions corresponding to each recessed groove at a predetermined interval along the circumferential direction from the internal side end of the center hole 31a.

Figure 4:
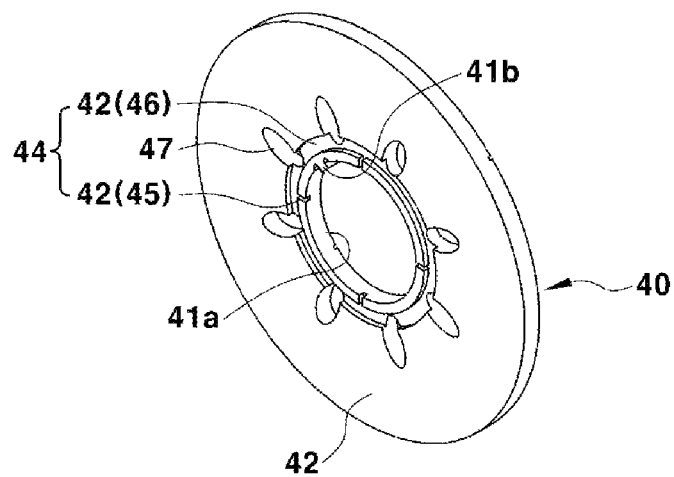
FIG. 4 is a perspective view of the cooling plate which may be used in the motor according to the exemplary embodiment of the present disclosure.
Figure 5A:
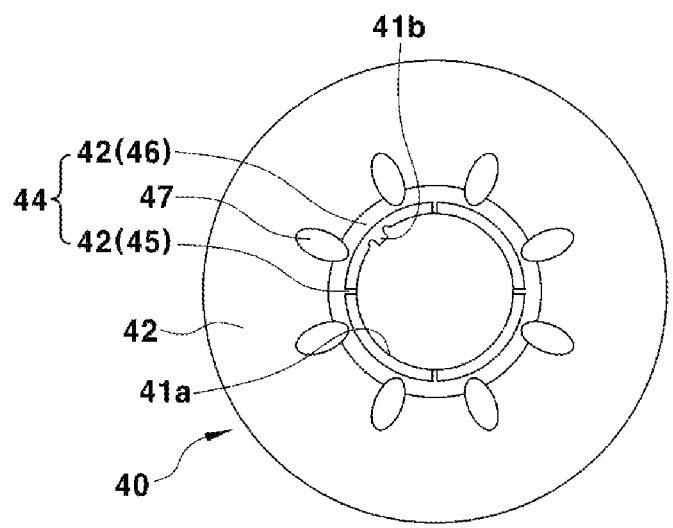
FIG. 5A and FIG. 5B are front views exemplarily illustrating each surface of the cooling plate in which a flow path groove is formed In an exemplary embodiment of the present disclosure.
Figure 5B:
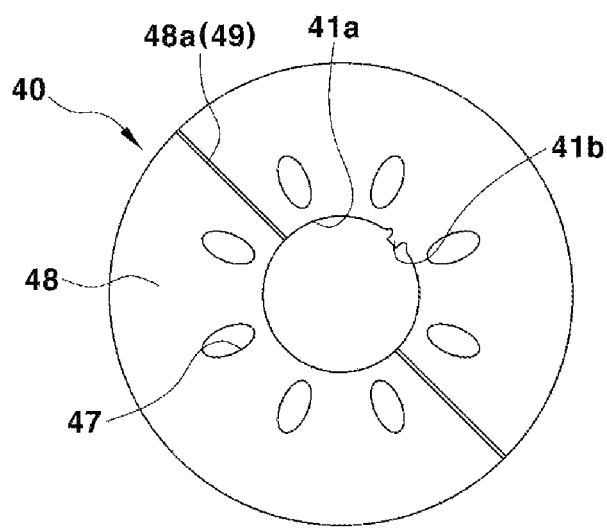

FIG. 4 is a perspective view of the cooling plate 40 which may be used in a motor according to an exemplary embodiment of the present disclosure, and FIG. 5A and FIG. 5B are front views of each surface of the cooling plate 40 in which flow path grooves 42a and 48a are formed In an exemplary embodiment of the present disclosure.

FIG. 5A illustrates the first surface 42 of the cooling plate 40, FIG. 5B illustrates the second surface 48 of the cooling plate 40, and illustrates the flow path grooves 42a and 48a formed on the first surface 42 and the first surface of the cooling plate 40, respectively.

The motor 1 according to the exemplary embodiment of the present disclosure includes the cooling flow path provided in the rotor 30 so that the cooling fluid passes, and the cooling flow path includes the distribution flow paths 44 and 48 that are configured between the cooling plate 40 and the rotor core 31 in the rotor 30, and the flow paths 33 and 35 that are provided on the rotor core 31 to extend along the axial direction and connected to the distribution flow path 44.

Here, first, describing the core flow path which is the cooling flow path of the rotor core through which the cooling fluid may flow, the core flow paths 33 and 35 include holes formed in each electrical steel sheet forming the rotor core 31.

That is, when holes are formed at the same position of all the electrical steel sheets to penetrate through each electrical steel sheet, and all the electrical steel sheets are mounted to be stacked to configure the rotor core 31 (the first core portion and the second core part), a flow path through which the cooling fluid may flow along the rotor core 31, that is, the core flow paths 33 and 35 may be configured while the holes of all the electrical steel sheets are connected to each other in the state in which the electrical steel sheets are stacked.

In an exemplary embodiment of the present disclosure, the core flow paths 33 and 35 are all formed in two core portions of the rotor core 31 mounted with the cooling plate 40 interposed therebetween, that is, the first core portion 32 and the second core portion 34, and the holes are formed at the same positions of each of the electrical steel sheet forming the first core portion 32 and the electrical steel sheet forming the second core portion 34 to penetrate through the electrical steel sheets.

Accordingly, when the electrical steel sheets are stacked to form each core portion, the holes of the electrical steel sheet form the core flow paths 33 and 35 extending long in a straight line along the axial direction in the corresponding core portions 32 and 34.

Furthermore, one end portion of the core flow path 33 of the first core portion 32 and one end portion of the core flow path 35 of the second core portion 34 are both connected to the distribution flow path (first distribution flow path 44) configured between the cooling plate 40 and the rotor core 31.

In the instant case, the other end portion of the core flow path 33 of the first core portion 32 and the other end portion of the core flow path 35 of the second core portion 34 each communicate with the discharge flow path (reference numeral "50" in FIG. 7) of the end plate 50 joined to the end portion of the core portion to enable fluid movement.

Accordingly, the core flow paths 33 and 35 each are flow paths formed to penetrate through the first core portion 32 and the second core portion 34 of the rotor core 31, and are flow paths formed to extend along the axial direction in the corresponding core portion.

Furthermore, when the rotor core 31, the cooling plate 40, and the end plate 50 are all mounted to the rotation shaft 20 of the motor 1, the core flow path 33 of the first core portion 32 and the core flow path 35 of the second core portion 34 both are flow paths connecting the distribution flow path 44 on the cooling plate 40 side and a discharge flow path 53 on the end plate 50 side to enable fluid movement.

In an exemplary embodiment of the present disclosure, the plurality of core flow paths 33 and 35 disposed at predetermined intervals along the circumferential direction may be formed in the rotor core 31. In the instant case, the plurality of core flow paths 33 and 35 may be formed to extend along the axial direction from the rotor core 31, respectively, and formed in parallel to each other. Furthermore, as described above, each of the core flow paths 33 and 35 is configured by connecting all the holes of the electrical steel sheet to be stacked.

The distribution flow paths 44 and 48 in the rotor 30 are configured to receive the cooling fluid from the rotation shaft 20 of the motor 1. As described above, the cooling fluid supplied to the motor 1 flows in the hollow internal space which is the cooling flow path of the rotation shaft 20, the cooling fluid in the hollow internal space of the rotation shaft 20 is introduced into the distribution flow path 44 of the rotor 30, and then is distributed and flows into the core flow path 33 of the first core portion 32 and the core flow path 35 of the second core portion 34.

Furthermore, the distribution flow paths 44 and 49 in the rotor 30 are flow paths that include the flow path grooves 42a and 48a formed on the first surface 42 and the second surface 48 of the cooling plate 40. That is, the distribution flow paths 44 and 49 are flow paths that include the flow path grooves 42a and 48a of the first surface 42 and the second surface 48 and the surface of the rotor core 31 while the surface of the rotor core 31 is joined to the first surface 42 and the second surface 48 of the cooling plate 40.

When the surface of the rotor core 31 is joined to the surfaces 42 and 48 on which the flow path grooves 42a and 48a are formed in the cooling plate 40, as the flow path grooves 42a and 48a are covered with the surface of the rotor core 31, the flow path along the flow path grooves 42a and 48a, that is, the distribution flow paths 44 and 49 through which the cooling fluid may flow along the paths of the flow path grooves 42a and 48a may be configured.

As described above, the distribution flow path formed by the rotor core 31 and the cooling plate 40 among the cooling flow paths of the rotor 30 includes the first distribution flow path 44 that distributes the cooling fluid introduced from the cooling flow path of the rotation shaft 20 into the core flow paths 33 and 35 of the rotor core 31.

Furthermore, the distribution flow path of the rotor 30 may further include the second distribution flow path 49 that supplies the cooling fluid introduced from the cooling flow path of the rotation shaft 20 to the gap S between the rotor 30 and the stator 60.

The first distribution flow path 44 and the second distribution flow path 49 both are flow paths that include the flow path grooves 42a and 48a of the cooling plate 40 and the joint surface of the rotor core 31 while the cooling plate 40 and the rotor core 31 are joined.

That is, the first distribution flow path 44 is a flow path that includes the flow path groove 42a formed on the first surface 42 of the cooling plate 40 and the joint surface of the rotor core 31, the second distribution flow path 49 is a flow path that includes the flow path groove 48a formed on the second surface 48 of the cooling plate 40 and the joint surface of the rotor core 31.

Referring to FIG. 5A, the flow path groove 42a formed on the first surface 42 of the cooling plate 40 is illustrated, and referring to FIG. 5B, the flow path groove 48a formed on the second surface 48 of the cooling plate 40 is illustrated.

The flow path groove 42a illustrated in FIG. 5A forms the first distribution flow path 44 that distributes the cooling fluid into the rotor core 31, and the flow path groove 48a illustrated in FIG. 5B is the rotor forms the second distribution flow path 49 that distributes the cooling fluid into the gap S between the rotor 30 and the stator 60.

Figure 6A:
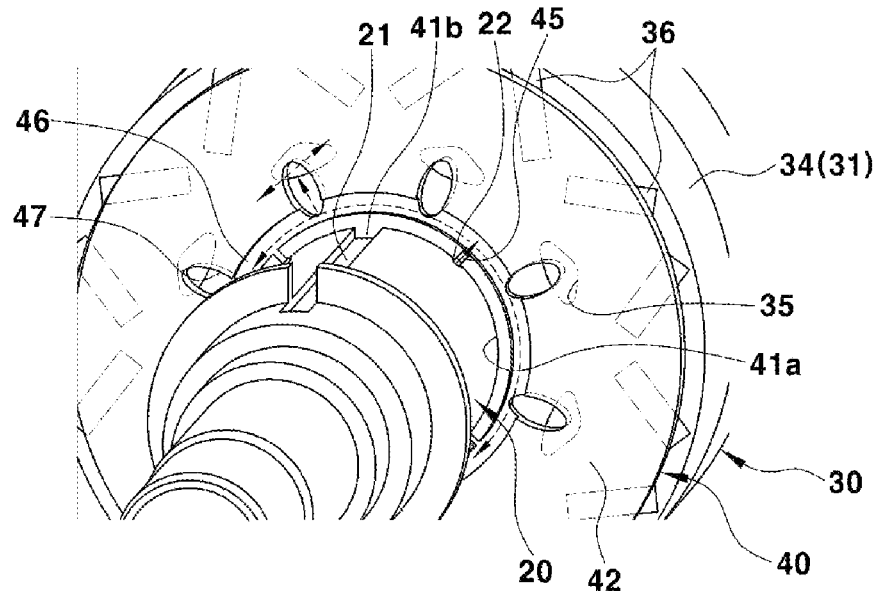
FIG. 6A and FIG. 6B are perspective views of a state in which the cooling plate and a rotor core are joined in the motor according to the exemplary embodiment of the present disclosure.
Figure 6B:
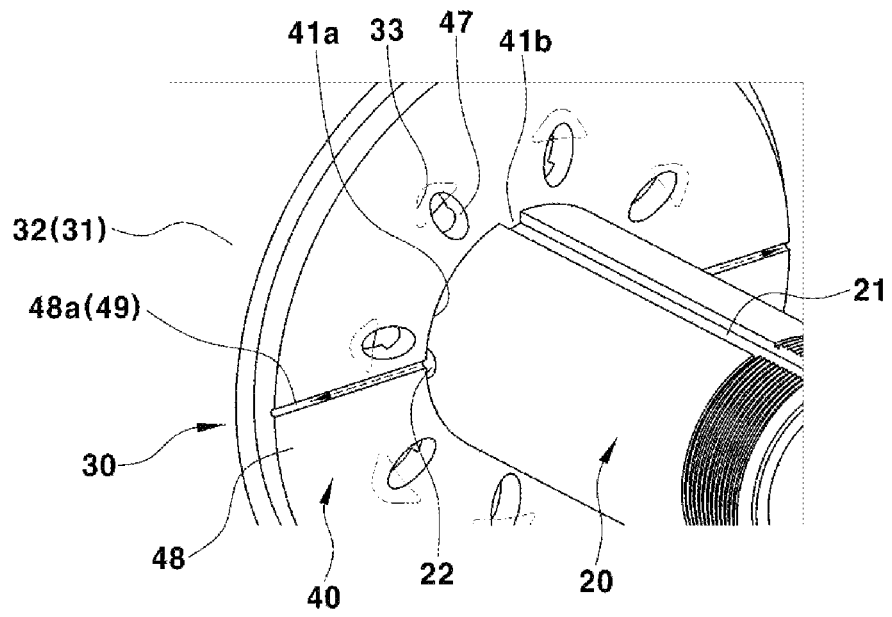

FIG. 6A and FIG. 6B are perspective views of the state in which the cooling plate 40 and the rotor core 31 are joined in the motor according to the exemplary embodiment of the present disclosure. One of the two core portions of the rotor core 31 joined to both surfaces of the cooling plate 40 is not illustrated in each drawing.

Referring to FIG. 6A, it may be seen that the cooling plate 40 and the second core portion 34 are joined to each other, and it may be seen that the flow path groove (reference numeral "42a" in FIG. 5A) forming the first distribution flow path (reference numeral "44" in FIG. 5A) is formed on the first surface 42 of the cooling plate 40.

In FIG. 6A, the first core portion (reference numeral "32" in FIGS. 2 and 6B) forming the first distribution flow path (reference numeral "44" in FIG. 5A) in the state joined to the first surface 42 of the cooling plate 40 is not illustrated.

When the first core portion 32 is joined to the first surface 42 of the cooling plate 40 illustrated in FIG. 6A, the flow path groove formed on the first surface 42 of the cooling plate 40 (reference numeral "42a" in FIG. 5A) forms the first distribution flow path 44 together with the joint surface of the first core portion 32.

In FIG. 6A, the flow path through which the cooling fluid flows from the rotation shaft 20 of the motor to the core flow path 35, which is the cooling flow path of the rotor core 31, through the first distribution flow path is shown by an arrow.

Referring to FIG. 6B, it may be seen that the cooling plate 40 and the first core portion 32 are joined to each other, and it may be seen that the flow path groove 48A forming the second distribution flow path is formed on the second surface 48 of the cooling plate 40. The flow path groove 48a forming the second distribution flow path 49 may be a linear groove extending long radially as illustrated in FIG. 6B.

In FIG. 6B, the second core portion (reference numeral "34" in FIGS. 2 and 6A) forming the second distribution flow path 49 in the state joined to the second surface 48 of the cooling plate 40 is not illustrated.

When the second core portion (reference numeral "34" in FIGS. 2 and 6A) is joined to the second surface 48 of the cooling plate 40 illustrated in FIG. 6B, the flow path groove 48a formed on the second surface 48 of the cooling plate 40 forms the second distribution flow path 49 together with the joint surface of the second core portion 34. In the instant case, the second distribution flow path 49 may be a linear flow path extending long radially.

In FIG. 6B, the flow path of the cooling fluid flowing radially toward the gap (reference numeral 'S' in FIG. 1) between the rotor (reference numeral "30" in FIG. 1) and the stator (reference numeral "60" in FIG. 1) along the second distribution flow path 49 from the rotation shaft 20 of the motor is shown by an arrow.

Furthermore, as illustrated in FIG. 3A and FIG. 3B and FIG. 6A and FIG. 6B, the through hole 22 is formed in the rotation shaft 20 of the motor 1 at a position where the cooling plate 40 is provided. The through hole 22 is a hole formed to penetrate through the rotation shaft 20 and is hole through which the hollow internal space which is the cooling flow path of the rotation shaft 20 and the external space (distribution flow path space) of the rotation shaft 20 communicate with each other. The through hole 22 is formed to enable the cooling fluid to pass from the hollow internal space of the rotation shaft 20 to the external space.

The through hole 22 of the rotation shaft 20 is connected to the distribution flow path among the cooling flow paths of the rotor 30, that is, one end portion of the first distribution flow path 44 and the second distribution flow path 49 including the flow path grooves 42a and 48a of the cooling plate 40 and the joint surface of the rotor core 31.

In an exemplary embodiment of the present disclosure, the plurality of through holes 22 may be formed on the rotation shaft 20 at predetermined intervals along the circumferential direction thereof. In the instant case, the through holes 22 to which one end portion of the first distribution flow path 44 is connected and the through holes 22 to which one end portion of the second distribution flow path 49 are connected are the rotation shaft 20 may be separate through holes each formed at different positions in the rotation shaft 20.

As described above, in the state in which the cooling plate 40 and the rotor core 31 are joined, the flow path groove 42a formed on the first surface 42 of the cooling plate 40 forms the first distribution flow path 44 together with the joint surface of the rotor core 31, and the first distribution flow path 44 is formed to extend long from the position corresponding to the rotation shaft through hole of the internal side end of the center hole 41a in the cooling plate 40 to the position corresponding to the core flow paths 33 and 35 (hole of the stacked electrical steel) of the rotor core 31.

In the exemplary embodiment of the present disclosure, the first distribution flow path 44 may include a connection flow path 45, an annular flow path 46, and a distribution hole 47, and among those, the connection flow path 45 and the annular flow path 46 are the flow path formed by the flow path groove 42a formed on the first surface 42 of the cooling plate 40 and the joint surface of the rotor core 31 covering the flow path groove 42a. However, the distribution hole 47 is formed to penetrate through the cooling plate 40.

One end portion of the connection flow path 45 between the cooling plate 40 and the rotor core 31 (first core part) is an inlet portion of the first distribution flow path 44 into which the cooling fluid is introduced from the cooling flow path through the through hole 22, and is formed at a position corresponding to the through hole of the rotation shaft of the internal side end of the center hole 41a in the cooling plate 40 so that it may communicate with the through hole 22 of the rotation shaft 20.

Furthermore, the other end portion of the connection flow path 45 is connected to the annular flow path 46 between the cooling plate 40 and the rotor core 31 (first core part). Accordingly, the connection flow path 45 becomes a flow path connecting between the through hole 22 of the rotation shaft 20 and the annular flow path 46, and guides the cooling fluid supplied from the rotation shaft 20 through the through hole 22 to flow into the annular flow path 46.

Furthermore, the plurality of connection flow paths 45 may be formed, and one connection flow path 45 may be provided in the through hole of the rotation shaft 20 to connect between the through hole of the rotation shaft 20 and the annular flow path 46. In the instant case, each connection flow path 45 may be formed to extend long radially from the position of the internal side end of the center hole 41a of the cooling plate 40 to the annular flow path 46.

The annular flow path 46 may be formed in a shape of a circle along the circumference of the center hole 41a between the cooling plate 40 and the rotor core 31 (first core part). In the instant case, the annular flow path 46 may be formed to extend long along a circular path with the center portion of the cooling plate 40 as the center portion of the circle.

The annular flow path 46 is configured to receive the cooling fluid introduced through the through hole 22 of the rotation shaft 20 through the connection flow path 45 and then supply the cooling fluid to each core flow path 33 and 35 of the rotor core 31 through the distribution hole 47.

The distribution hole 47 is formed to penetrate through the cooling plate 40 at a position corresponding to each core flow path of the rotor core 31, and at least partially overlaps the flow path groove 42a of the annular flow path 46 and the core flow paths 33 and 35 of the two core portions 32 and 34.

This distribution hole 47 is configured to distribute the cooling fluid flowing along the flow path groove 42a of the annular flow path 46 in both directions toward the core flow paths 33 and 35 of the two core portions 32 and 34 joined to both surfaces of the cooling plate 40.

In the exemplary embodiment of the present disclosure, the distribution hole 47 may be formed corresponding to the number core flow paths 33 and 35 of the rotor core 31. Furthermore, each distribution hole 47 may be formed in a long shape in one direction to connect between the annular flow path 46 and the core flow paths 33 and 35 of the rotor core 31.

In the instant case, at least a portion of the distribution hole 47 may be formed at a position overlapping the path of the annular flow path 46, and another portion thereof may be formed at a position overlapping the core flow paths 33 and 35 of the rotor core 31 (the first core portion and the second core part). Accordingly, each distribution hole 47 provides a flow path connecting the annular flow path 46 to the core flow path 33 of the first core portion 32 and the core flow path 35 of the second core portion 34 at the same time.

The core flow path 33 (hole of the electrical steel sheet) of the first core portion 32 and the core flow path 35 (hole of the electrical steel sheet) of the second core portion 34 may be formed at the same position on the cross-section of the rotor core 31.

In the instant case, when the first core portion 32 and the second core portion 34 are mounted with the cooling plate 40 interposed therebetween, the core flow paths 33 and 35 of the first core portion 32 and the core flow paths 33 and 35 of the second core portion 34 show a flow path structure connected in a straight line with the distribution hole 47 of the cooling plate 40 interposed therebetween.

As a result, even though the flow path groove 42a is formed on the first surface 42 of the cooling plate 40 to form the connection flow path 45 of the first distribution flow path 44 and the annular flow path 46 only on the first surface 42 of the cooling plate 40, the cooling fluid may be distributed and flow in both directions from the distribution hole 47 toward the first core portion 32 and the second core portion 34.

That is, the cooling fluid may be distributed and flow from the distribution hole 47 to the core flow path 33 of the first core portion 32 and the core flow path 35 of the second core portion 34, so that the cooling fluid flows in both the first core portion 32 and the second core portion 34, cooling both the first core portion 32 and the second core portion 34.

Of course, since the plurality of core flow paths 33 and 35 are formed in the first core portion 32 and the second core portion 34, the cooling fluid moving along the annular flow path 46 may be distributed into the core flow paths 33 and 35 of the two core portions 32 and 34 through the distribution holes 47 formed at positions corresponding to the core flow paths.

Referring to FIG. 6A, it may be seen that the rotor core 31, that is, the core flow paths 33 and 35 of the first core portion 32 and the second core portion 34 are positioned radially outside the annular flow path 46. In the instant case, it may be seen that, as the annular flow path 46 and the core flow path 33 and 35 are positioned at a distance spaced from each other with a predetermined distance in the radial direction, each distribution hole 47 is formed in a long shape in one direction so that both sides of the annular flow path 46 and the core flow path 33 and 35 may communicate with each other.

When the annular flow path 46 is formed as a path passing through a position overlapping the core flow paths 33 and 35, each distribution hole 47 may be formed in the annular flow path 46 at a position overlapping the core flow paths 33 and 35. That is, in the annular flow path 46, the distribution hole 47 may be formed at each position where it meets (overlaps) the core flow paths 33 and 35 of the first core portion 32 and the second core portion 34.

As described above, the plurality of core flow paths 33 and 35, which are the cooling flow paths of the rotor core 31, are formed at a position where each end portion overlaps the distribution hole 47 of the cooling plate 40 so that the cooling fluid may be supplied through the communicating distribution hole 47.

As a result, the cooling fluid distributed from each distribution hole 47 into the core flow path 33 of the first core portion 32 may be discharged to the outside of the rotor 30 through the discharge flow path 53 on the end plate 50 side joined to the end portion of the first core portion 32, and the cooling fluid distributed from each distribution hole 47 into the core flow path 35 of the second core portion 34 may be discharged to the outside of the rotor 30 through the discharge flow path 53 on the end plate 50 side joined to the end portion of the second core portion 34.

The cooling fluid cools the rotor portions, such as the rotor core 31 and the permanent magnet 36, while flowing along the core flow path 33 of the first core portion 32 and the core flow path 35 of the second core portion 34, and accordingly, is discharged to the outside of the rotor 30 through the discharge flow path 53 configured between the end plate 50 and the rotor core 31.

Figure 7:
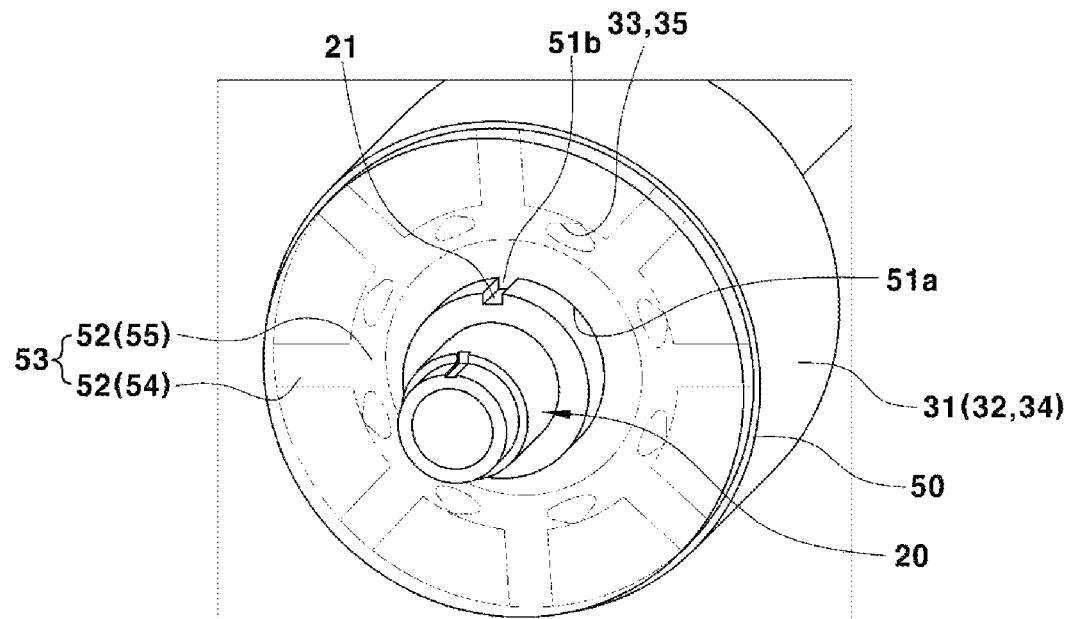
FIG. 7 is a diagram illustrating a discharge flow path formed on an end plate side of the rotor in the motor according to the exemplary embodiment of the present disclosure.

FIG. 7 is a diagram illustrating the discharge flow path 53 formed on an end plate 50 side of the rotor in the motor according to the exemplary embodiment of the present disclosure. As illustrated, even in the case of the two end plates 50 stacked on both end portions of the rotor core 31 in the axial direction, a protrusion 51b may be positioned on the internal side end of the center hole 51a through which the rotation shaft 20 passes.

Furthermore, when the end plate 50 is mounted to the rotation shaft 20, the protrusion 51b of the end plate 50 may be mounted to be inserted into the recessed groove 21 of the rotation shaft 20. As a result, the two end plates 50 may also be rotated integrally with the rotation shaft 20 at all times.

The plurality of protrusions 51b which may be respectively inserted into the recessed grooves 21 of the rotation shaft 20 at the internal side end of the center hole 51a even in each end plate 50 may be formed to be disposed one by one at each position corresponding to the recessed grooves at a predetermined interval along the circumferential direction thereof.

These end plates 50 are joined one by one to both end portions of the rotor core 31, that is, the end portion of the first core portion 32 and the end portion of the second core portion 34, and a flow path groove 52 is formed on a surface joined to the core portion of the end plate 50.

As in the cooling plate 40, in the state in which each end plate 50 is joined to the corresponding core portions 32 and 34, when the joint surface of the core portions 32 and 34 covers the flow path groove 52 of each end plate 50, the flow path groove 52 of the end plate 50 and the joint surface of the core portions 32 and 34 form the discharge flow path 53.

As illustrated in FIG. 7, the discharge flow path 53 between the end plate 50 and the rotor core 31 (the first core portion and the second core part) in the exemplary embodiment of the present disclosure includes an annular flow path 54 formed along a path passing through a position overlapping with the core flow paths 33 and 35 of the rotor core 31 and a radial flow path 55 formed to extend long from the annular flow path 54 to the external peripheral portion of the end plate 50.

In the end plate 50, the annular flow path 54 may be formed along the periphery of the center hole 51, which may be a circular flow path with the center portion of the end plate 50 as a center portion of a circle. In the instant case, the plurality of core flow paths 33 and 35 in the rotor core 31 may be disposed at equal intervals in a shape of a circle when viewed from the cross section of the rotor core 31 like the annular flow path 54 of the discharge flow path 53.

Furthermore, a plurality of radial flow paths 55 between the end plate 50 and the rotor core 31 may be formed to extend radially from the annular flow path 46 to the external peripheral portion of the end plate 50. In the instant case, each radial flow path 55 may be a linear flow path.

One end portion of each radial flow path 55 communicates with the annular flow path 54, and the other end portion of each radial flow path 55 is an outlet portion through which the cooling fluid is discharged to the outside of the rotor 30, and may be formed to be disposed on the external peripheral portion of the end plate 50 at regular intervals along the circumferential direction thereof.

Consequently, while the rotor 30 is rotated when the motor 1 is driven, some of the cooling fluid supplied through the through hole 22 from the cooling flow path (hollow internal space) of the rotation shaft 20 passes through the first distribution flow path 44 ("connection flow path 45→annular flow path 46→distribution hole 47") between the cooling plate 40 and the rotor core 31 (first core part), and then flows along a path of the "core flow paths 33 and 35 of the rotor core 31 (the first core portion and the second core part)→the discharge flow path 53 ("annular flow path 54→radial flow path 55") between the end plate 50 and the rotor core 31)".

In the present process, the cooling fluid cools the rotor portions such as the rotor core 31 and the permanent magnet 36 while passing through the core flow paths 33 and 35 of the rotor core 31, and then the cooling fluid passing through the core flow paths 33 and 35 of the rotor core 31 is discharged to the outside of the rotor 30 through the radial flow path 55 of the discharge flow path 53 on the end plate 50 side by centrifugal force. In the present way, the cooling fluid discharged to the outside of the rotor 30 is sprayed and scattered to the end coil portion 62 of the coil wound around the stator 60 to cool the end coil portion 62.

Meanwhile, the flow path groove 48a for configuring the second distribution flow path 49 which is formed on the surface opposite to the first surface 42 of the cooling plate 40, that is, on the second surface 48. In a state in which the second core portion 34 is joined to the second surface 48 of the cooling plate 40, the joint surface of the second core portion 34 covers the flow path groove 48a formed on the second surface 48 of the cooling plate 40, so that the second distribution flow path 49 through which the cooling fluid may flow in one direction may be configured.

The second distribution flow path 49 includes a plurality of radial flow paths formed to extend radially between the cooling plate 40 and the rotor core 31 (second core part). The radial flow path is a flow path formed to extend from the internal side end of the center hole 41a of the cooling plate 40 to the external peripheral portion of the cooling plate 40.

In the instant case, one end portion of each radial flow path is the inlet through which the cooling fluid flows through the through hole 22 in the hollow internal space which is the cooling flow path of the rotation shaft 20, and one end portion of each radial flow path is formed to be disposed at a position corresponding to the through hole of the rotation shaft 20 at the internal side end of the center hole 41a of the cooling plate 40. In the instant case, one end portion of each radial flow path may be formed to be positioned at a predetermined interval along the circumferential direction in the external peripheral portion of the cooling plate 40.

Furthermore, the other end portion of each radial flow path is an outlet through which the cooling fluid that has passed through the inside is discharged to the gap S between the rotor 30 and the stator 60, and the other end portion of each radial flow path may be formed to be positioned at a predetermined interval along the circumferential direction in the external peripheral portion of the cooling plate 40.

As a result, some of the cooling fluid supplied through the through hole from the cooling flow path (hollow internal space) of the rotation shaft 20 is discharged to the gap S between the rotor 30 and the stator 60 through the second distribution flow path 49 (radial flow path) between the cooling plate 40 and the rotor core 31 (second core part), cooling the stator portions such as the stator core 61 and the coil.

The radial flow path of the second distribution flow path 49 may be a linear flow path extending radially from the center portion of the rotor 30 to the external peripheral portion of the rotor 30. In the instant case, the cooling fluid supplied through the through hole 22 of the rotation shaft 20 during the rotation of the rotor 30 is discharged and scattered to the gap S between the rotor 30 and the stator 60 by centrifugal force in the radial flow path of the second distribution flow path 49, cooling the core portion (the center portion based on the axial direction) of the stator 60 and the like.

In an exemplary embodiment of the present disclosure, the second distribution flow path 49 may be selectively applied. That is, it is possible to configure the cooling flow path for cooling the rotor 30 of the motor 1 only with the first distribution flow path 44 without the second distribution flow path.

Figure 8:
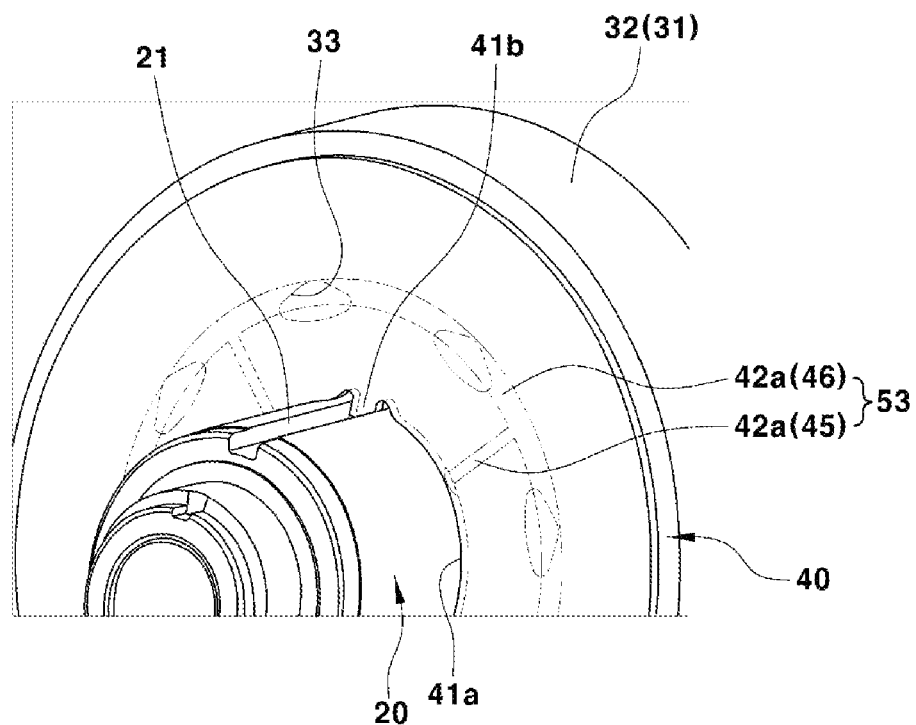
FIG. 8 is a perspective view exemplarily illustrating an exemplary embodiment in which a first distribution flow path is configured only with a connection flow path and an annular flow path without a distribution hole as another exemplary embodiment of the present disclosure.

Furthermore, in an exemplary embodiment of the present disclosure, the first distribution flow path 44 may be configured only with the connection flow path 45 and the annular flow path 46 without the distribution hole (reference numeral '47' in FIG. 6A and FIG. 6B). FIG. 8 is a perspective view exemplarily illustrating the exemplary embodiment in which the first distribution flow path 44 is configured only with the connection flow path 45 and the annular flow path 46 without the distribution hole as another exemplary embodiment of the present disclosure.

As illustrated in FIG. 8, in the instant case, the connection flow path 45 of the first distribution flow path 44 is the same as described above, but the annular flow path 46 of the first distribution flow path 44 is formed and provided to follow a circular path passing through a position overlapping with the core flow paths 33 and 35 of the rotor core 31.

Furthermore, as illustrated in FIG. 8, the connection flow path 45 and the annular flow path 46 may be configured on both surfaces of the cooling plate 40 between the first core portion 32 and the second core portion 34 so that the cooling fluid passing through the first distribution flow path 44 in the exemplary embodiment without the distribution hole may be simultaneously supplied and distributed to the core flow path 33 of the first core portion 32 and the core flow path 35 of the second core portion 34.

To the present end, the flow path grooves 42a for configuring the connection flow path 45 and the annular flow path 46 of the first distribution flow path 44 may be formed in the same shape on both surfaces of the cooling plate 40. In the instant case, the second distribution flow path may be omitted.

Accordingly, in the state in which two cooling plates 40 of the same shape are joined, the two joined cooling plates 40 may be mounted to the rotation shaft 20 to be located between the first core portion 32 and the second core portion 34.

In the instant case, the flow path groove 42a for configuring the connection flow path 45 and the annular flow path 46 as illustrated in FIG. 8 is formed on the surface joined to the first core portion 32 or the second core portion 34 in each cooling plate 40.

Accordingly, in the state in which one of the two cooling plates 40 is joined to the first core portion 32, the connection flow path 45 and the annular flow path 46 through which the cooling fluid supplied through the through hole 22 of the rotation shaft 20 is supplied to the core flow path 33 of the first core portion 32 may be configured between the joined cooling plate 40 and first core portion 32.

Similarly, in the state in which the other of the two cooling plates 40 is joined to the second core portion 34, the connection flow path 45 and the annular flow path 46 through which the cooling fluid supplied through the through hole 22 of the rotation shaft 20 is supplied to the core flow path 35 of the second core portion 34 may be configured between the joined cooling plate 40 and second core portion 34.

The flow path grooves 48a for forming the radial flow path of the second distribution flow path 49 as described above may be formed on one or both of the two surfaces where the cooling plates are joined to each other among the surfaces of both cooling plates 40.

When the flow path grooves 48a are formed only on one (the surface where the cooling plates are joined to each other) of the two cooling plates 40, individual radial flow paths may be configured as the joint surface of the other cooling plate 40 covers the flow path grooves 48a of the one cooling plate 40 in the state in which the two cooling plates 40 are joined to each other, one side of the cooling plate 40.

To configure the radial flow path of the second distribution flow path 49, when each flow path groove 48a is formed on both the joint surfaces of the two cooling plates 40, the plurality of flow path grooves 48a may be formed at the same position or at different positions on the joint surface of the two cooling plates 40 that are joined to each other.

In the instant case, when the flow path grooves 48a are formed at the same position among the joint surfaces of the two cooling plates 40, one radial flow path may be formed in the state in which the flow path grooves 48a of both cooling plates 40 overlap and folded with each other with one radial flow. In the instant case, each radial flow path may have a linear flow path shape extending long radially from the corresponding through hole 22 of the rotation shaft 20 to the external peripheral portion of the cooling plate 40.

On the other hand, when the flow path grooves 48a are formed at different positions among the joint surfaces of the two cooling plates 40, as each flow path groove 48a of the cooling plate 40 on one side is covered with the surface of the portion where flow path grooves 42a and 48a are not formed in the cooling plate 40 on the other side, one radial flow path through which the cooling fluid may flow in one direction may be configured by each flow path groove 48a.

Even in the instant case, each radial flow path may have a linear flow path shape extending long radially from the corresponding through hole 22 of the rotation shaft 20 to the external peripheral portion of the cooling plate 40. Furthermore, even in the instant case, the cooling fluid supplied to the radial flow path of the second distribution flow path 49 through the through hole 22 of the rotation shaft 20 may be discharged into the gap S between the rotor 30 and the stator 60, and then cool the stator 60.

In the present way, the configuration of the motor including the cooling flow path according to the exemplary embodiment of the present disclosure has been described in detail, and in the motor according to the exemplary embodiment of the present disclosure described above, it is possible to lower the temperature of the rotor portions such as the core and the permanent magnet as well as the stator portions such as the core and the coil by the cooling by the cooling fluid (oil), and ultimately, improve the output performance and durability.

Furthermore, in the motor according to the exemplary embodiment of the present disclosure, only the cooling flow path extending in the axial direction from the rotor core is formed by adopting the cooling structure in which the cooling fluid is distributed into the core flow path of the rotor core through the cooling plate.

Accordingly, in an exemplary embodiment of the present disclosure, it is possible to improve the problem of the conventional motor including complicated cooling oil extending in the axial and radial directions to the rotor core, that is, the problem of lowering the strength of the rotor core, and secure and maintain the necessary strength of the rotor core.

Accordingly, according to a motor including a cooling flow path according to an exemplary embodiment of the present disclosure, it is possible to lower the temperature of rotor portions such as a core and a permanent magnet as well as the temperature of stator portions such as the core and a coil through cooling by a cooling fluid, and ultimately, improve the output performance and durability of the motor. implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A motor, comprising:
   a rotor and a stator,
   wherein the rotor includes:
      a rotor core including a plurality of core portions disposed on a rotation shaft along an axial direction of the rotor, wherein the rotor core includes a core flow path through which a cooling fluid passes through each core portion; and
      a cooling plate which is inserted between two neighboring core portions among the plurality of core portions so that first and second surfaces thereof are joined to the two neighboring core portions,
   wherein a distribution flow path that distributes the cooling fluid supplied from a cooling flow path of the rotation shaft into the core flow path of the two neighboring core portions are provided between at least one of the two neighboring core portions and the cooling plate,
   wherein a flow path groove is formed on a joint surface of the cooling plate to which the core portion are joined,
   wherein a joint surface of the core portions joined to the joint surface of the cooling plate and the flow path groove of the cooling plate form the distribution flow path,
   wherein the distribution flow path includes:
      a first distribution flow path that distributes a part of the cooling fluid supplied from the cooling flow path of the rotation shaft into the core flow path of the two neighboring core portions; and
      a second distribution flow path that supplies a remainder of the cooling fluid supplied from the cooling flow path of the rotation shaft to a gap between the rotor and the stator,
   wherein the first distribution flow path includes a flow path groove formed on the first surface of the cooling plate, and a joint surface of a first core portion joined to the first surface of the cooling plate among the two neighboring core portions, and
   wherein the second distribution flow path includes a flow path groove formed on the second surface of the cooling plate, and a joint surface of a second core portion joined to the second surface of the cooling plate among the two neighboring core portions.

2. The motor of claim 1, wherein a through hole through which a hollow internal space, which is the cooling flow path, fluidically communicates with the first distribution flow path and the second distribution flow path is formed to penetrate through the rotation shaft so that the cooling fluid in the hollow internal space of the rotation shaft is supplied to the first distribution flow path and the second distribution flow path through the through hole.

3. The motor of claim 1, wherein the first distribution flow path further includes a distribution hole which is formed to penetrate through the cooling plate and distributes the cooling fluid flowing along the flow path groove in first and second directions toward the core flow path of the two neighboring core portions.

4. The motor of claim 3, wherein at least a portion of the distribution hole is formed to overlap the flow path groove and the core flow path of the two neighboring core portions, respectively, so that the flow path groove formed on the first surface fluidically communicates with the core flow path of the two neighboring core portions in a state in which the two neighboring core portions are joined to first and second sides of the cooling plate.

5. The motor of claim 4,
   wherein the core flow path is formed to penetrate through a corresponding core portion along the axial direction of the rotation shaft,
   wherein a plurality of core flow paths disposed along a circumferential direction around the rotation shaft are formed in each of the core portions, and
   wherein a plurality of distribution holes overlapping each of the core flow paths disposed in the circumferential direction are formed in the cooling plate.

6. The motor of claim 3, wherein the first distribution flow path further includes:
   a connection flow path that fluidically communicates with the cooling flow path of the rotation shaft so that the cooling fluid is supplied from the cooling flow path of the rotation shaft; and
   an annular flow path which is disposed on the cooling plate along a periphery of a center hole through which the rotation shaft passes and is connected to the connection flow path so that the cooling fluid moves to the distribution hole.

7. The motor of claim 6, wherein a plurality of through holes through which a hollow internal space fluidically communicates with the first distribution flow path are formed to be disposed in the rotation shaft along a circumferential direction, and
- as the connection flow path, a plurality of connection flow paths for individually connecting each of the through holes and the annular flow path are provided.

8. The motor of claim 1,
- wherein a through hole through which a hollow internal space, which is the cooling flow path, fluidically communicates with the second distribution flow path is formed to penetrate through the rotation shaft, and
- wherein the second distribution flow path includes a radial flow path which is provided to extend from a position of a through hole of the rotation shaft to a position of an external peripheral portion of the cooling plate.

9. The motor of claim 1,
- wherein a plurality of through holes through which a hollow internal space, which is the cooling flow path, fluidically communicates with the second distribution flow path is formed to penetrate through the rotation shaft, and
- wherein the second distribution flow path includes a plurality of radial flow paths that are provided to extend from positions of each of the through holes of the rotation shaft to a position of an external peripheral portion of the cooling plate.

10. The motor of claim 1, wherein the distribution flow path is configured between the first and second surfaces of the cooling plate and the two neighboring core portions joined to the first and second surfaces of the cooling plate so that the cooling fluid supplied from the cooling flow path of the rotation shaft is supplied from the first and second surfaces of the cooling plate to the core flow path of each of the joined core portions.

11. The motor of claim 10,
- wherein the distribution flow path includes:
  - a connection flow path that fluidically communicates with the cooling flow path of the rotation shaft so that the cooling fluid is supplied from the cooling flow path of the rotation shaft on the first and second surfaces of the cooling plate; and
  - an annular flow path which is connected to the connection flow path and disposed around a center hole through which the rotation shaft passes in the cooling plate, and
  - wherein the annular flow path is configured along a path passing through a position overlapping the core flow path of each of the joined core portions on the first and second surfaces of the cooling plate.

12. The motor of claim 1, wherein a through hole through which a hollow internal space, which is the cooling flow path, fluidically communicates with the distribution flow path is formed in the rotation shaft so that the cooling fluid in the hollow internal space of the rotation shaft is supplied to the distribution flow path through the through hole.

13. The motor of claim 1,
- wherein the rotor further includes an end plate which is joined to an end portion of each core portion to be disposed on first and second end portions of the rotor core, and
- wherein a discharge flow path which is supplied with the cooling fluid passing through each core flow path of the rotor core and discharges the supplied cooling fluid to an outside of the rotor is provided between each of the end plates and the core portion joined to each of the end plates.

14. The motor of claim 13, wherein the core flow path is formed to penetrate through a corresponding core portion along the axial direction of the rotation shaft, and is connected between the distribution flow path and the discharge flow path so that the cooling fluid moves.

15. The motor of claim 14,
- wherein a flow path groove is formed on a joint surface of the cooling plate to which the core portion is joined, and
- wherein the joint surface of the core portion joined to the joint surface of the end plate and the flow path groove of the end plate form the discharge flow path.

16. The motor of claim 15, wherein the distribution flow path includes:
- an annular flow path which is configured along a circumference of a center hole through which the rotation shaft passes in the end plate and fluidically communicates with the core flow path of the joined core portion; and
- a plurality of radial flow paths that are configured to extend from the annular flow path in the end plate to an external peripheral portion of the end plate.

17. The motor of claim 13, wherein the discharge flow path in the rotor is provided to discharge the cooling fluid toward a coil end portion of a coil wound around the stator.

* * * * *